(12) United States Patent
Prinz et al.

(10) Patent No.: US 6,361,748 B1
(45) Date of Patent: Mar. 26, 2002

(54) BARRIER ELECTRODE FOR TREATING SURFACES OF ELECTRICALLY CONDUCTIVE OR NON-CONDUCTIVE MATERIALS AND ARRANGEMENT OF SUCH BARRIER ELECTRODES

(75) Inventors: Eckhard Prinz, Hamfelde; Bernd Martens, Buchholz; Claus Lorentz, Hamburg, all of (DE)

(73) Assignee: SOFTAL Electronic Erik Blumenfeld GmbH & Co., Hamburg (DE)

( * ) Notice: Subject to any disclaimer, the term of this patent is extended or adjusted under 35 U.S.C. 154(b) by 0 days.

(21) Appl. No.: 09/539,305

(22) Filed: Mar. 30, 2000

(30) Foreign Application Priority Data

Apr. 21, 1999 (EP) .............................. 99107861

(51) Int. Cl.⁷ ............................................... B01J 19/08
(52) U.S. Cl. .................. 422/186; 422/186.21; 204/164
(58) Field of Search ........................... 422/186, 186.21; 204/164, 176

(56) References Cited

U.S. PATENT DOCUMENTS 1,588,976 A * 6/1926 McBlain ................ 422/186.07
6,054,018 A * 4/2000 Denes et al. ............ 422/186.05

FOREIGN PATENT DOCUMENTS

| DE | 9402370 | 4/1994 |
|---|---|---|
| EP | 0381044 | 8/1990 |
| EP | 0621667 | 10/1994 |

* cited by examiner

Primary Examiner—Kathryn Gorgos
Assistant Examiner—Thao Tran
(74) Attorney, Agent, or Firm—Friedrich Kueffner

(57) ABSTRACT

A barrier electrode for the treatment of surfaces of electronically conductive or non-conductive materials with medium frequency electric discharges and a barrier electrode arrangement with one or more such barrier electrodes, wherein the barrier electrode is constructed as a tube of dielectric material with two ducts extending parallel to each other in the longitudinal direction of the tube. The duct which in the position of use faces the counter electrode is provided with a high voltage conductor and the other duct serves for supplying a temperature-influencing medium or a process gas.

7 Claims, 3 Drawing Sheets

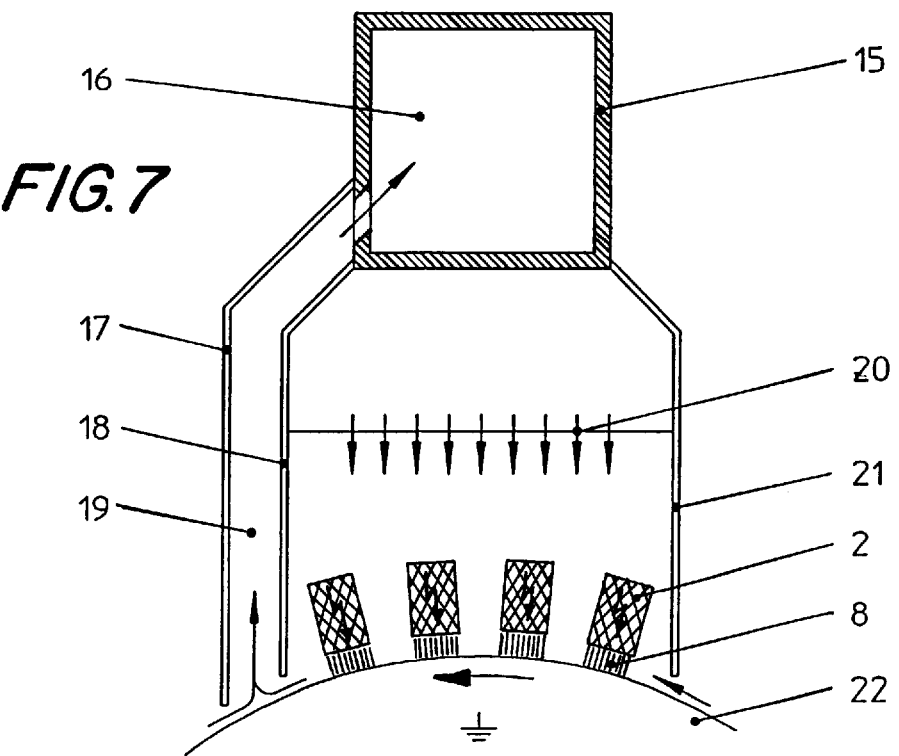
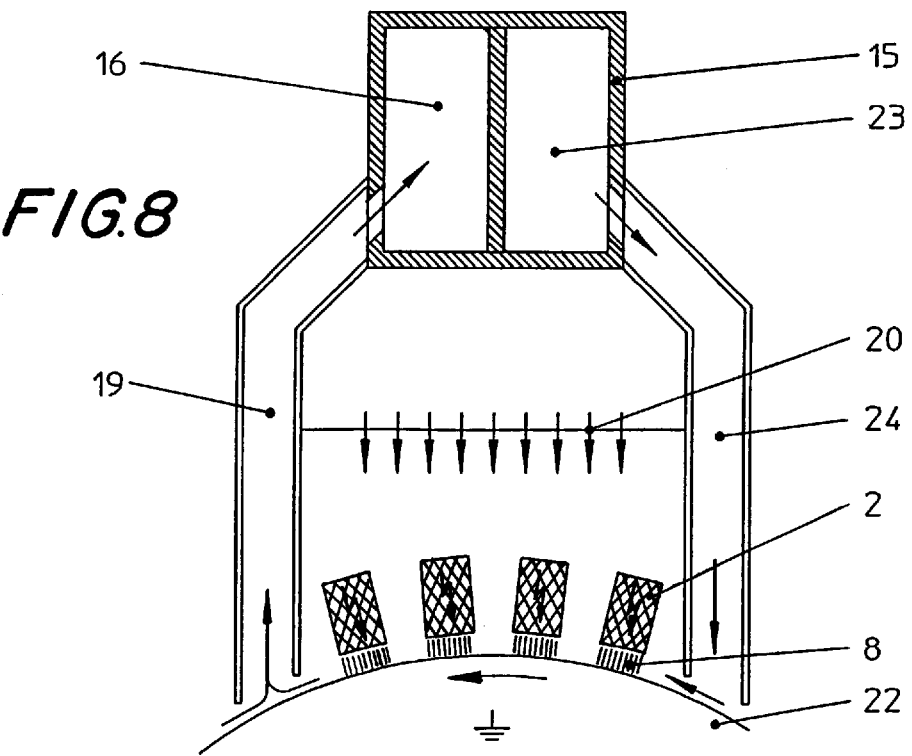

BARRIER ELECTRODE FOR TREATING SURFACES OF ELECTRICALLY CONDUCTIVE OR NON-CONDUCTIVE MATERIALS AND ARRANGEMENT OF SUCH BARRIER ELECTRODES

BACKGROUND OF THE INVENTION

1. Field of the Invention

The present invention relates to a barrier electrode for the treatment of surfaces of electronically conductive or non-conductive materials with medium frequency electric discharges. The present invention also relates to a barrier electrode arrangement with one or more such barrier electrodes.

2. Description of the Related Art

Barrier electrodes are used in surface technology in an arrangement of single or double barrier electrodes for treating the surfaces of electrically conductive or non-conductive materials. The rod-shaped barrier electrode to which high voltage is applied is usually arranged opposite a counter electrode. The counter electrode is provided either with or without a dielectric barrier. Cylinder as well as plate geometries are used for the counter electrode. The counter electrode is electrically switched to ground potential. The material to be treated (substrate) is placed closely on the grounded counter electrode and forms relative to the high voltage electrode a gap of a few millimeters across which the barrier discharge is ignited.

German Gebrauchsmuster 94 023 70 discloses an electrode for corona treatment which is composed of a metal core provided with an electrical sheathing. The metal core has throughbores for conducting a cooling medium therethrough. An electrode constructed in this manner is arranged parallel to the counter electrode which in most cases is cylindrical.

EP 0 621 667 discloses an electrode which is composed of an oblong hollow copper body which is provided with a dielectric on at least that surface which is located opposite the counter electrode. Liquid is conducted through the hollow electrode for cooling the electrode.

In the barrier electrodes described above and in other barrier electrodes, whether they have a dielectric-coated metal core or hollow body or a dielectric profile with metal core, sliding discharges occur at the electrode sides in dependence on the applied voltage.

Depending on the applied voltage, the sliding discharges may reach the support components; this leads to damage after a short period of time and to a failure of the plant for the surface treatment. Moreover, the sliding discharges have a spark-like or filament-like discharge character with channels with high current density. The high current density leads to an undesirable thermal heating of the electrode system and of the material to be treated. The filament-like discharge character can additionally lead to a non-uniform surface treatment. In the case of sensitive substrates which are usually thin, local damage may also occur on the surface due to thermal overheating. Consequently, the electrical energy which has been supplied is partially converted into heat which is not utilized.

The following problems occur at least to some extent in the known barrier electrodes:
  the structural configuration results in sliding discharges which lead to a destruction of the support components;
  sliding discharges are the cause of thermal loads on the electrode and on the material to be treated; this makes it necessary to cool the electrode;
  the coating on the metal carrier develops microscopic cracks over time due to the thermal expansion; this results in an electric short circuit which leads to a failure of the treatment station and, thus, to a stoppage of the production;
  a supply of processed gas is not provided.

SUMMARY OF THE INVENTION

Therefore, it is the primary object of the present invention to provide a barrier electrode and an arrangement of barrier electrodes of the above-described type in which the problems mentioned above do not occur and especially the disadvantageous sliding discharges are prevented.

In accordance with the present invention, the barrier electrode is constructed as a tube of dielectric material with two ducts extending parallel to each other in the longitudinal direction of the tube, wherein the duct which in the position of use faces the counter electrode is provided with a high voltage conductor, and wherein the other second duct serves for supplying a temperature-influencing medium or a process gas.

Consequently, the barrier electrode according to the present invention practically is composed completely of dielectric material in the form of a tube provided with two ducts. The two ducts are arranged so as to extend parallel to the counter electrode, wherein the duct facing the counter electrode contains the high voltage conductor. A temperature-influencing medium or a process gas flows through the duct facing away from the counter electrode.

Sliding discharges cannot occur in such a configuration.

In accordance with an advantageous feature, the high voltage conductor is a flat component and is arranged parallel to and on the inner surface of the first duct which faces the counter electrode in the position of use.

In accordance with another advantageous feature, the discharge surface which in the position of use faces the counter electrode is provided with a surface corrugation in order to improve the ignition.

It is also possible to form the high voltage conductor which is arranged in the first duct facing the counter electrode by a filling of metal granulate.

If the high voltage conductor is constructed flat, it is advantageous to fill the remaining hollow space with a dielectric granulate.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 7 is a schematic transverse sectional view of a device for carrying out an electric surface treatment with barrier electrodes according to the present invention; and FIG. 8 is a schematic sectional view corresponding to FIG. 7, showing another embodiment.

DESCRIPTION OF THE PREFERRED EMBODIMENTS

Figure 1:
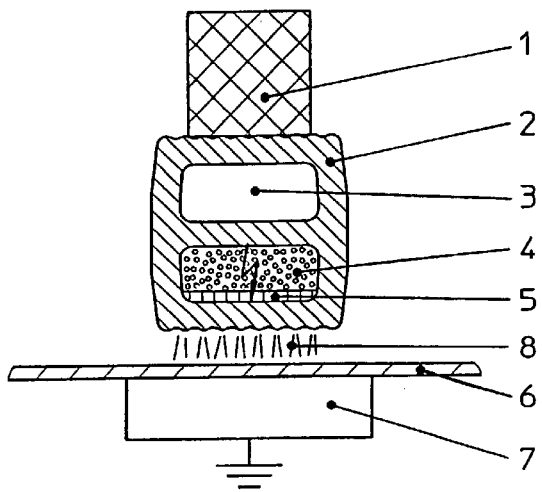
FIG. 1 is a transverse sectional view of a first embodiment of a barrier electrode according to the present invention.

As illustrated in the drawing, the barrier electrode includes a support component 1 for a tubular base body 2 of dielectric material. Two ducts 3 and 4 are provided in the tubular base body, wherein the two ducts are separated from each other and extend parallel to the counter electrode 7 constructed as a cylinder or a plate. The substrate to be treated is denoted by 6. The barrier discharge is denoted by 8.

Provided in the first duct 4 which faces the counter electrode 7 is a high voltage conductor 5 in the form of a flat component. The second duct 3 located above the first duct 4 conducts a temperature-influencing medium.

Figure 2:
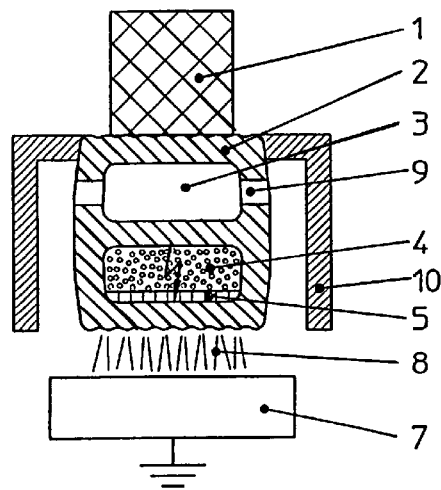
FIG. 2 is a sectional view, corresponding to FIG. 1, of a modified embodiment of the barrier electrode according to the present invention.

The embodiment according to FIG. 2 is additionally provided with openings 9 which, together with covers 10, conduct process gas out of the second duct 3 into the area of discharge 8.

Figure 3:
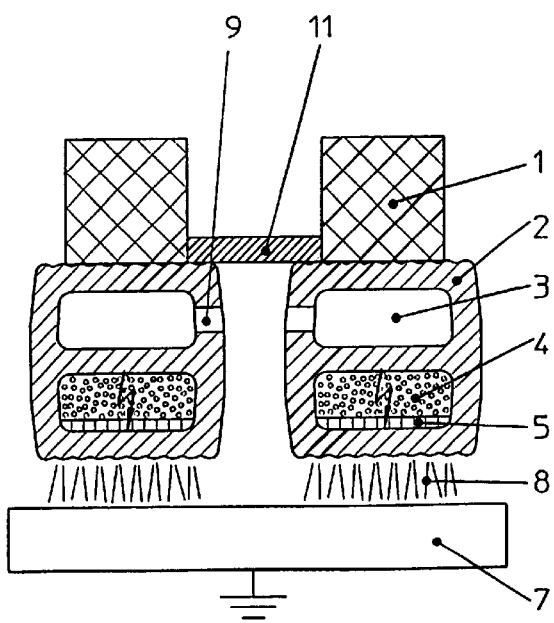
FIG. 3 is a schematic transverse sectional view of a barrier electrode arrangement with two barrier electrodes arranged next to each other.

In the embodiment according to FIG. 3, two barrier electrodes are arranged next to each other. Process gas is conducted through openings 9 from the second duct 3 into the area of discharge 8. A cover is denoted by 11.

Figure 4:
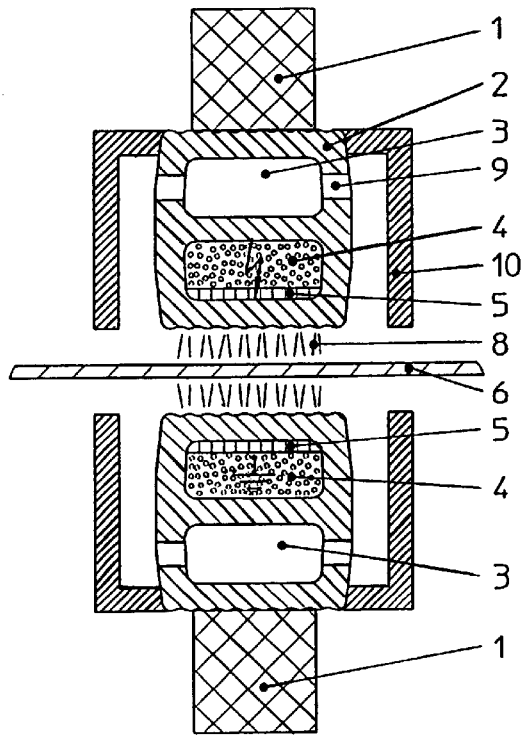
FIG. 4 is a schematic transverse sectional view of a barrier electrode arrangement with two barrier electrodes arranged opposite each other, wherein the barrier electrodes are of the same construction as those of FIG. 2.

In the embodiment according to FIG. 4, a barrier electrode of the type illustrated in FIG. 2 is arranged on each side of the material 6 to be treated. This makes possible a simultaneous treatment of both material surfaces.

Figure 5:
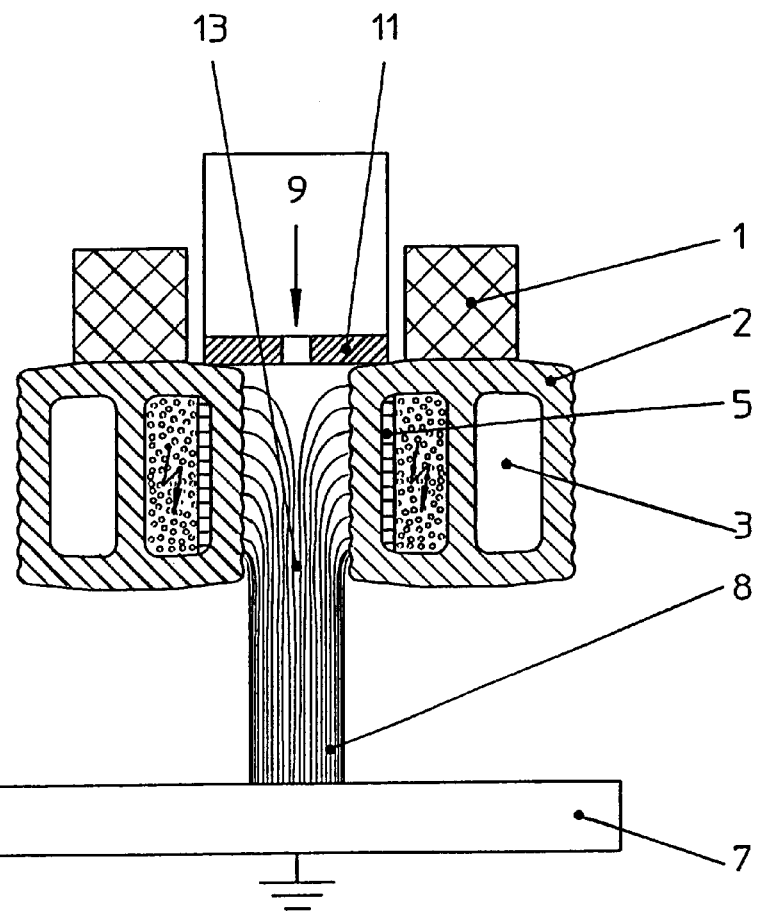
FIG. 5 is a schematic transverse sectional view of a barrier electrode arrangement with two barrier electrodes which face each other.

In the embodiment according to FIG. 5, two barrier electrodes are arranged in such a way that the high voltage conductors face each other and are arranged at a distance of 0.5–10 mm from the grounded counter electrode 7. In this arrangement, carrier gas with process gas is injected through the gas distributor 9 between the barrier electrodes, wherein these barrier electrodes are activated by the discharge 13. This discharge is a sliding dischargecontrolled barrier discharge 8 towards the counter electrode.

Figure 6:
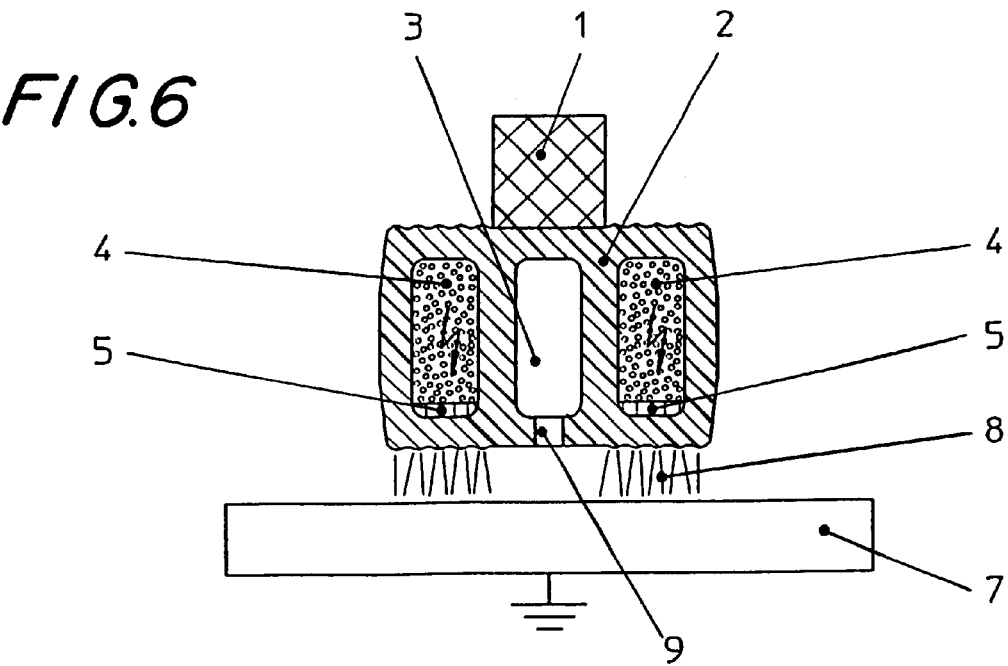
FIG. 6 is a schematic transverse sectional view of a barrier electrode arrangement with two ducts which contain high voltage conductors and which are separated from each other by a duct for supplying process gas.

In the embodiment according to FIG. 6, three ducts are provided in the base body 2 of dielectric material. However, in this embodiment, practically two ducts 4 form the first duct with the high voltage conductor 5. The second duct three for supplying process gas is located in the middle. The process gas escapes at 9.

In accordance with the present invention, the high voltage carrier is essentially formed by a flat component of a suitable metal, wherein the remaining hollow space may be filled out with a dielectric. However, the high voltage conductor can also be formed by a metal granulate which fills out the entire hollow space.

By separating the functions into different ducts, it is made possible that, when the first duct is completely filled out with a conductor in the form of a metal filling, the occurring sliding discharges can never damage the support components. The sliding discharges are limited to the area of the duct which contains the high voltage conductor. The second duct of the base body of dielectric material serves for supplying a predominantly gaseous medium for temperature-influencing or for supplying a process gas.

When cooling is provided, it is possible to increase the electrode power up to about 3 kW/m. At the present time, 1 kW/m is usual in the known barrier electrodes. When cooling, for example, by means of compressed air, the electrode temperature can be lowered by about 50° C. as compared to uncooled systems. As a result of cooling, a high temperature difference of 30 to 100° C. is adjusted between the discharge surface and the support surface. This results in a reduction of the thermal load on the support components and the electrode and, thus, to a high operational safety. Another significant advantage of the direct electrode cooling is the increase of the specific electrode output. In conventional electrodes, this output is limited to about 1 kW/m. Cooling permits an increase to about 3 kW/m which reduces the number of electrodes while maintaining a high total output. Also, the cooler electrodes make it possible to treat thermally sensitive materials with a high discharge dose without damage, for example, in case of contact.

FIGS. 7 and 8 show two embodiments in which the barrier electrodes or barrier electrode arrangements according to FIGS. 1 to 6 are mounted in appropriate devices.

In the embodiment of FIG. 7, a carrier profile 15 acts as a suction or exhaust duct 16. This suction duct 16 is connected through a duct 19 formed by side walls 17 and 18 to the outlet area of the arrangement composed of electrode and counter electrode. A side wall in the inlet area is denoted by 21. Cooling air is supplied at 20. The counter electrode is denoted by 22 and is constructed as a revolving cylindrical electrode over which the material is conducted. In the embodiment according to FIG. 8, a duct system 23 and 24 for gas is provided in the carrier profile 15 in addition to the suction system 16 and 19. The duct system 23 and 24 is connected tot he inlet area and serves for the gas injection in this area. A reactive gas mixture may additionally be supplied through the duct 20.

It is readily apparent that the actual surface treatment is carried out by four, or up to a possible ten, barrier electrode arrangements 2 of the type described above and illustrated in FIGS. 1 through 6.

While specific embodiments of the invention have been shown and described in detail to illustrate the inventive principles, it will be understood that the invention may be embodied otherwise without departing from such principles.

We claim:

1. A barrier electrode for treating surfaces of electrically conductive or non-conductive materials with medium frequency electric discharges, the barrier electrode comprising a tubular member of dielectric material having first and second ducts extending parallel relative to each other in a longitudinal direction of the tubular member, wherein the first duct facing a counter electrode in a position of use comprises a high voltage conductor, and wherein the second duct is configured for supplying a temperature-influencing medium or a process gas.

2. The barrier electrode according to claim 1, wherein the high voltage conductor is comprised of a flat component extending parallel to and located on an inner surface of a first duct facing the counter electrode in the position of use.

3. The barrier electrode according to claim 2, wherein a hollow space of the first duct not filled in by the high voltage conductor is filled in with a dielectric granulate.

4. The barrier electrode according to claim 1, wherein the barrier electrode comprises a discharge surface facing the counter electrode in the position of use, and wherein the discharge surface is corrugated.

5. The barrier electrode according to claim 1, wherein the high voltage conductor is comprised of a filling with a metal granulate.

6. The barrier electrode according to claim 1, wherein the tubular member of dielectric material has a width and a height of 10 to 50 mm, and wherein a distance from the counter electrode is 0.5 to 5 mm.

7. A barrier electrode arrangement with at least two barrier electrodes, each barrier electrode comprising a tubular member of dielectric material having first and second ducts extending parallel relative to each other in a longitudinal direction of the tubular member, wherein the first ducts facing a counter electrode in a position of use comprise high voltage conductors, and wherein each second duct is configured for supplying a temperature-influencing medium or a process gas, wherein the barrier electrodes are arranged next to each other on a side of a surface to be treated such that the first ducts with the high voltage conductors face each other, wherein a gap configured for supplying process gas in a direction toward the surface to be treated is defined between the barrier electrodes.

* * * * *